United States Patent [19]

Mandai et al.

[11] 4,403,236

[45] Sep. 6, 1983

[54] BOUNDARY LAYER TYPE SEMICONDUCTING CERAMIC CAPACITORS WITH HIGH CAPACITANCE

[75] Inventors: Haruhumi Mandai, Nagaokakyo; Kunitaro Nishimura, Youkaichi; Masami Yamaguchi, Nagaokakyo, all of Japan

[73] Assignee: Murata Manufacturing Co., Ltd., Japan

[21] Appl. No.: 193,400

[22] Filed: Oct. 2, 1980

[30] Foreign Application Priority Data

Oct. 9, 1979 [JP] Japan ............................... 54-130523
Oct. 9, 1979 [JP] Japan ............................... 54-130524

[51] Int. Cl.$^3$ ............................................ H01L 29/12
[52] U.S. Cl. ........................................ 357/10; 357/61; 252/520; 252/500; 252/62.3 BT
[58] Field of Search ................... 357/10, 61; 252/520, 252/500, 62.3 BT

[56] References Cited

U.S. PATENT DOCUMENTS 4,143,207  3/1979  Itakura .......................... 252/520 X
4,222,783  9/1982  Atsumi .......................... 252/520 X

*Primary Examiner*—Martin H. Edlow

[57] ABSTRACT

A boundary layer type semiconducting ceramic capacitor with high capacitance is disclosed. The capacitor comprises a semiconducting ceramic body in which grain boundaries on crystal grains of the semiconducting ceramic body are insulated, characterized in that said semiconducting ceramic body has a composition consisting essentially of 98.1 to 99.88 mole % of a main component $(Sr_{1-x}Ba_x)TiO_3$ or $(Sr_{1-x}Ba_x)TiO_3$ modified with a titanete and/or a zirconate, wherein x is a mole fraction of Ba and takes a value ranging from 0.30 to 0.50, and 0.1 to 1.0 mol % of at least one semiconductorizing agent selected from the group consisting of rare earth elements, Nb, Ta and W, and that said grain boundaries of the crystal grains are insulated by at least one insulating agent selected from the group consisting of Mn, Bi, Cu, Pb, B and Si, and that the maximum crystal grain present in the semiconducting ceramic body has a grain size ranging from 100 to 250μ. The composition contains 0.02 to 0.2 mole % of Mn as a mineralizing agent or insulating agent. The composition may further contain at least one of 0.05 to 0.5 mole % of $SiO_2$ and 0.02 to 0.2 mole % of $Al_2O_3$.

14 Claims, No Drawings

BOUNDARY LAYER TYPE SEMICONDUCTING CERAMIC CAPACITORS WITH HIGH CAPACITANCE

This invention relates to boundary layer type semiconducting ceramic capacitors with high capacitance.

There are various types of semiconducting ceramic capacitors such as barrier layer type, surface layer type, boundary layer type, which are small in size but large in capacitance. Among them, boundary layer type semiconducting ceramic capacitors are superior in various electric characteristics such as dielectric loss, insulating resistance, change rate of capacitance, distortion factor and equivalent series resistance, but inferior in capacitance to the semiconducting ceramic capacitors of the barrier layer type or surface layer type. For example, the boundary layer type capacitors possess $\tan\delta$ (dielectric loss) ranging from 0.5 to 1.5% and capacitance of 200 to 300 nF/cm² at the maximum, while the barrier layer type or surface layer type capacitors possess $\tan\delta$ ranging from 4 to 5% and the capacitance of 400 to 500 nF/cm² at the maximum.

It is therefore an object of the present invention to provide boundary layer type semiconducting ceramic capacitors with high capacitance which possess the advantages of the prior art semiconducting ceramic capacitors of the boundary layer type.

The boundary layer semiconducting ceramic capacitor according to the present invention comprises a semiconducting ceramic body in which grain boundaries on crystal grains of the semiconducting ceramic body are made into an insulator, characterized in that the semiconducting ceramic body has a composition consisting essentially of 98.1 to 99.88 mole % of a main component $(Sr_{1-x}Ba_x)TiO_3$ or $(Sr_{1-x}Ba_x)TiO_3$ modified with a titanate and/or a zirconate, wherein x is a mole franction of Ba and takes a value ranging from 0.30 to 0.50, 0.1 to 1.0 mole % of at least one semiconductorizing agent selected from the group consisting of rare earth elements, Nb, Ta and W, and 0.02 to 0.2 mole % of Mn. The composition may contain at least one oxide selected from the group of 0.05 to 0.5 mole % of $SiO_2$ and 0.02 to 0.2 mole % of $Al_2O_3$.

In the above composition, the mole fraction of Ba in $(Sr_{1-x}Ba_x)TiO_3$, i.e., x is limitted to 0.30 to 0.50 for the following reasons. If x is less than 0.30, it is difficult to produce semiconducting ceramic capacitors with high capacitance (Cs) and good temperature coefficient of the capacitance($\Delta TC$). If x is more than 0.50, it results in the lowering of the capacitance, increase of the $\tan\delta$ and temperature coefficient of the capacitance.

When one or more titanates such as calcium titanate, or zirconates such as barium zirconate are incorporated in the composition as a part of main component, their content is preferably not more than 10 mole %. If the content of the titanate and/or zirconate is more than 10 mole %, it is impossible to expect the improvement in the sintering property and reproducibility of the electric characteristics.

The semiconductorizing agent is contained in the composition in an amount ranging from 0.1 to 1.0 mole %. If the content of the semiconductorizing agent is out of the above range, it is only possible to produce semiconducting ceramic bodies with resistance ranging from $10^°$ to $10^{-1}\Omega$ cm even if the composition is fired in a neutral or reducing atmosphere.

Manganese contributes by simplifying the control of the grain size of the semiconducting ceramic body, so that it is preferred to incorporate manganese in an amount ranging from 0.02 to 0.2 mole % in terms of $MnO_2$. If the content of Mn is less than 0.020 mole %, it is impossible to obtain sufficient effect of Mn. If the content of Mn is more than 0.2 mole %, it results in the increase of $\tan\delta$. The grain size of the semiconducting ceramic body may be controlled, for example, by changing the mole fractions of the main components, but if the composition of the semiconducting ceramic body contains no manganese, the semiconducting ceramics containing crystal grains with a maximum grain size not less than $100\mu$ can be obtained only in a narrow range. In contrast therewith, if manganese is contained in the composition, it is possible to easily produce the semiconducting ceramic bodies containing crystal grains having a maximum grain size not less than $100\mu$ even if the mole fractions of the constituents over the main component is changed in a wide range. Although manganese is not necessarily required to be present in the interior of the crystal grains, it is required to be present at either the interior of the crystal grains or the grain boundaries.

The incorporation of $SiO_2$ and/or $Al_2O_3$ into the composition contributes to lower the firing temperature and to increase the dielectric breakdown voltage. The content of $SiO_2$ is preferably within the range of 0.05 to 0.5 mole %. If the content of $SiO_2$ is less than 0.05 mole %, it is impossible to lower the firing temperature. If the content of $SiO_2$ is more than 0.5 mole %, it causes the lowering of dielectric constant. If $Al_2O_3$ is incorporated in the composition, it is preferred to incorporate $Al_2O_3$ in an amount ranging from 0.02 to 0.2 mole % because, if the content of $Al_2O_3$ is less than 0.02 mole %, it is impossible to increase the dielectric breakdown voltage. If the content of $Al_2O_3$ is more than 0.2 mole %, it causes a lowering of the dielectric constant.

In order to insulate the crystal grain boundaries of the semiconducting ceramic bodies, the semiconducting ceramic bodies are heat-treated in an oxidizing atmosphere, e.g., air or oxygen so as to diffuse ar least one insulating agent such as metal or metal compound selected from the group consisting of Mn, Bi, Cu, Pb, B, Si and their oxides. Before heat-treatment of the semiconducting ceramic body, it is necessary to provide the insulating agent on the surface of the semiconducting ceramic body. This may be carried out by the well-known vapour deposition method, or by applying a metal oxide paste on the ceramic body. The insulatorizing agent may be diffused into the ceramic body in an amount of 0.2 to 2.0 weight percent with respect to the amount of the ceramic body.

The semiconducting ceramic body may be produced by the steps of weighing and mixing raw materials, forming into shaped bodies, and then firing the shaped bodies in a neutral or reducing atmosphere. The crystal grain size, particularly the maximum grain size of the crystal grains of the resultant semiconducting ceramic bodies, affects the electric characteristics of the boundary layer capacitors produced therefrom, so that the maximum grain size is preferably not less than $100\mu$ and not more than $250\mu$. If the maximum grain size is less than $100\mu$, it causes deterioration of the capacitance, temperature coefficient and change rate of capacitance. If it is more than $250\mu$, it results in the deterioration of the electric characteristics and becomes a barrier to obtaining high capacitance.

The composition is allowed to contain inevitable impurities, but it is preferred to control the amount of such impurities as small as possible. In addition to Mn, $SiO_2$ and $Al_2O_3$, there may be used, as a mineralizing agent, metal oxides such as $TiO_2$, ZnO, $Bi_2O_3$ and CuO. The addition of a small amount of these mineralizing agents contributes to improve the sintering property and reproducibility of the semiconducting ceramic bodies.

The invention will be further apparent from the following description with respect to examples.

EXAMPLES

Using main raw materials such as $SrCO_3$, $BaCO_3$, $TiO_2$, $CaTiO_3$ and $BaZrO_3$, semiconductorizing agents such as $Y_2O_3$, $La_2O_3$, $WO_3$ and $Nb_2O_5$, and mineralizing agents such $MnCO_3$, $SiO_2$, $Al_2O_3$ and $TiO_2$, there are prepared mixtures by weighing and mixing the above materials to produce semiconducting ceramic bodies each having a composition as shown in Table 1. Each resultant mixture is calcined at 1100° C. for 2 hours in air, clushed, ball-milled, and granulated by adding 10 wt % of polyvinyl acetate resin. The resultant granules are sifted by a 30 mesh sieve to obtain the minus sieve, and then shaped into discs with a diameter of 10 mm and a thickness of 0.5 mm under a pressure of 750 $Kg/cm^2$. The shaped discs are calcined in air at 1150° C. for 2 hours, and then fired in a reducing atmosphere consisting of 2 vol % of hydrogen and 98 vol % of nitrogen at 1400° C. for 2 to 4 hours to produce semiconducting ceramic discs.

To insulate the grain boundaries of the crystal grains, the resistant semiconducting ceramic discs are applied on their surfaces metal oxide paste A,B,C,D, E or F having a composition described below, and then heat-treated in air at 1150° C. for 2 hours. The heat-treated discs are applied with a known paste for silver electrodes on its opposite surfaces and baked at 800° C. for 30 minutes to finish the boundary layer semiconducting ceramic capacitors.

(Composition of Paste)

Paste A: $Bi_2O_3$ 42 wt %, CuO 4 wt %, $MnCO_3$ 4 wt %, resin varnish 50 wt %

Paste B: $Pb_3O_4$ 40 wt %, $MnCO_3$ 10 wt %, resin varnish 50 wt %

Paste C: $Bi_2O_3$ 40 wt %, $Pb_3O_4$ 10 wt %, resin varnish 50 wt %

Paste D: $Pb_3O_4$ 45 wt %, CuO 5 wt %, resin varnish 50 wt %

Paste E: $Bi_2O_3$ 45 wt %, $H_3BO_3$ 5 wt %, resin varnish 50 wt %

Paste F: $MnCO_3$ 45 wt %, $Bi_2O_3$ 5 wt % resin varnish 50 wt %

The finished capacitors were measured for capacitance (Cs), dielectric loss (tan$\delta$), insulating resistance (IR), temperature coefficient of capacitance ($\Delta$TC), change rate of capacitance (DCB), distortion factor (dB) and equivalent series resistance(E.S.R.). The results obtained are shown in Table 2. In Tables 1 and 2, an asterisk (*) designates a specimen whose composition is outside the composition of the present invention; the others being within the scope of the present invention.

The electrical characteristics listed in Table 2 are measured under the following conditions:

Cs and Tan: a value measured at 20° C., a frequency of 1 KHz and a voltage below 0.2 Vrms IR: a value measured at 20° C. and after 30 seconds from the time at which a DC voltage of 10 V per unit thickness(mm) of the specimen is applied.

$\Delta$TC: a value obtained by the equation $$\frac{Cs.\ max - Cs.\ 20}{Cs.\ 20} \times 100\%$$

$$\frac{Cs.\ min - Cs.\ 20}{Cs.\ 20} \times 100\%$$

where

Cs.20 = capacitance at 20° C.

Cs.max = maximum capacitance in a temperature range of −25° to +85° C.

Cs.min = minimum capacitance in a range of −25° to +85° C.

DCB: a value obtained by the equation $$\frac{Cs.\ 02 - Cs.\ 10}{Cs.\ 02} \times 100\%$$

where

Cs.02 = Capacitance measure when a DC voltage of 0.2 V is applied at 20° C.

Cs.10 = Capacitance measure when a DC voltage of 10 V is applied at 20° C.

Distortion factor: a value which shows oberall distortion factor at 20° C., a frequency of 1 KHz and an applied voltage of 1 V.

E.S.R. = a value measured at about 1 MHz.

As will be understood from the above examples, the boundary layer semiconducting ceramic capacitors according to the present invention possess high capacitance of not less than 450 $nF/cm^2$, a small temperature coefficient not more than 10%, and other excellent electric characteristics, compared with conventional boundary layer capacitors.

TABLE 1

| Specimen No. | Main component (mole %) | (mole %) | Semiconductor-izing agent (mole %) | $MnO_2$ (mole %) | Mineralizing agent (mole %) | Maximum grain size ($\mu$) | Insulatoriz-ing agent |
|---|---|---|---|---|---|---|---|
| 1* | $(Sr_{0.40}Ba_{0.60})TiO_3$: 99.9 | — | $Y_2O_3$: 0.1 | — | — | 130 | A |
| 2* | $(Sr_{0.50}Ba_{0.50})TiO_3$: 99.9 | — | $Y_2O_3$: 0.1 | — | — | 60 | B |
| 3 | $(Sr_{0.50}Ba_{0.50})TiO_3$: 99.9 | — | $Y_2O_3$: 0.1 | — | — | 160 | A |
| 4* | $(Sr_{0.50}Ba_{0.50})TiO_3$: 99.7 | — | $La_2O_3$: 0.3 | — | — | 160 | C |
| 5* | $(Sr_{0.60}Ba_{0.40})TiO_3$: 99.7 | — | $La_2O_3$: 0.3 | — | — | 70 | A |
| 6 | $(Sr_{0.60}Ba_{0.40})TiO_3$: 99.7 | — | $La_2O_3$: 0.3 | — | — | 130 | B |
| 7* | $(Sr_{0.60}Ba_{0.40})TiO_3$: 99.7 | — | $WO_3$: 0.3 | — | — | 130 | C |
| 8* | $(Sr_{0.70}Ba_{0.30})TiO_3$: 99.7 | — | $WO_3$: 0.3 | — | — | 60 | B |
| 9 | $(Sr_{0.70}Ba_{0.30})TiO_3$: 99.7 | — | $WO_3$: 0.3 | — | — | 180 | A |
| 10* | $(Sr_{0.70}Ba_{0.30})TiO_3$: 99.8 | — | $Nb_2O_5$: 0.2 | — | — | 180 | C |
| 11* | $(Sr_{0.80}Ba_{0.20})TiO_3$: 99.8 | — | $Nb_2O_5$: 0.2 | — | — | 120 | B |
| 12 | $(Sr_{0.60}Ba_{0.40})TiO_3$: 94.8 | $CaTiO_3$: 5.0 | $Nb_2O_5$: 0.2 | — | — | 100 | A |

TABLE 1-continued

| Specimen No. | Main component (mole %) | | Semiconductor-izing agent (mole %) | MnO₂ (mole %) | Mineralizing agent (mole %) | Maximum grain size (μ) | Insulatoriz-ing agent |
|---|---|---|---|---|---|---|---|
| 13 | $(Sr_{0.50}Ba_{0.50})TiO_3$: 94.9 | $BaZrO_3$: 5.0 | $Er_2O_3$: 0.1 | — | — | 140 | B |
| 14 | $(Sr_{0.60}Ba_{0.40})TiO_3$: 99.7 | — | $Er_2O_5$: 0.1 | — | $TiO_2$: 0.2 | 110 | A |
| 15 | $(Sr_{0.70}Ba_{0.30})TiO_3$: 99.7 | — | $Y_2O_3$: 0.1 | — | $SiO_2$: 0.1 | 170 | A |
| 16 | $(Sr_{0.50}Ba_{0.50})TiO_3$: 99.7 | — | $Y_2O_3$: 0.2 | — | $Al_2O_3$: 0.1 | 200 | A |
| 17 | $(Sr_{0.60}Ba_{0.40})TiO_3$: 99.3 | — | $WO_3$: 0.2 $Y_2O_3$: 0.2 | — | $SiO_2$: 0.2 $Al_2O_3$: 0.1 | 130 | A |
| 18 | $(Sr_{0.60}Ba_{0.40})TiO_3$: 93.3 | $CaTiO_3$: 3.0 $BaZrO_3$: 3.0 | $WO_3$: 0.2 $Y_2O_3$: 0.2 | — | $SiO_2$: 0.2 $Al_2O_3$: 0.1 | 130 | A |
| 19* | $(Sr_{0.60}Ba_{0.40})TiO_3$: 97.6 | — | $WO_3$: 0.2 $Y_2O_3$: 0.2 | — | $SiO_2$: 1.0 $Al_2O_3$: 1.0 | 130 | A |
| 20* | $(Sr_{0.40}Ba_{0.60})TiO_3$: 99.8 | — | $Y_2O_3$: 0.1 | 0.1 | — | 120 | D |
| 21* | $(Sr_{0.50}Ba_{0.50})TiO_3$: 99.8 | — | $Y_2O_3$: 0.1 | 0.1 | — | 50 | E |
| 22 | $(Sr_{0.50}Ba_{0.50})TiO_3$: 99.8 | — | $Y_2O_3$: 0.1 | 0.1 | — | 150 | F |
| 23* | $(Sr_{0.60}Ba_{0.40})TiO_3$: 99.7 | — | $La_2O_3$: 0.1 | 0.2 | — | 70 | D |
| 24 | $(Sr_{0.60}Ba_{0.40})TiO_3$: 99.85 | — | $La_2O_3$: 0.1 | 0.05 | — | 160 | E |
| 25* | $(Sr_{0.70}Ba_{0.30})TiO_3$: 99.5 | — | $WO_3$: 0.3 | 0.2 | — | 60 | F |
| 26* | $(Sr_{0.70}Ba_{0.30})TiO_3$: 99.69 | — | $WO_3$: 0.3 | 0.01 | — | 130 | D |
| 27 | $(Sr_{0.70}Ba_{0.30})TiO_3$: 99.5 | — | $WO_3$: 0.3 | 0.2 | — | 150 | D |
| 28* | $(Sr_{0.70}Ba_{0.30})TiO_3$: 98.7 | — | $WO_3$: 0.3 | 1.0 | — | 140 | D |
| 29* | $(Sr_{0.80}Ba_{0.20})TiO_3$: 99.5 | — | $WO_3$: 0.3 | 0.2 | — | 150 | E |
| 30 | $(Sr_{0.60}Ba_{0.40})TiO_3$: 94.7 | $CaTiO_3$: 5.0 | $Nb_2O_5$: 0.2 | 0.1 | — | 150 | F |
| 31 | $(Sr_{0.50}Ba_{0.50})TiO_3$: 94.7 | $BaZrO_3$: 5.0 | $Nb_2O_5$: 0.2 | 0.1 | — | 110 | D |
| 32 | $(Sr_{0.60}Ba_{0.40})TiO_3$: 99.6 | — | $Er_2O_5$: 0.1 | 0.1 | $TiO_2$: 0.2 | 190 | E |
| 33 | $(Sr_{0.70}Ba_{0.30})TiO_3$: 99.7 | — | $Er_2O_5$: 0.1 | 0.1 | $SiO_2$: 0.1 | 170 | F |
| 34 | $(Sr_{0.50}Ba_{0.50})TiO_3$: 99.7 | — | $Er_2O_5$: 0.1 | 0.1 | $Al_2O_3$: 0.1 | 170 | D |
| 35 | $(Sr_{0.60}Ba_{0.40})TiO_3$: 99.2 | — | $WO_3$: 0.2 $Y_2O_3$: 0.2 | 0.1 | $SiO_2$: 0.2 $Al_2O_3$: 0.1 | 140 | E |
| 36* | $(Sr_{0.60}Ba_{0.40})TiO_3$: 97.5 | — | $WO_3$: 0.2 $Y_2O_3$: 0.2 | 0.1 | $SiO_2$: 1.0 $Al_2O_3$: 1.0 | 140 | E |
| 37* | $(Sr_{0.60}Ba_{0.40})TiO_3$: 99.1 | — | $WO_3$: 0.2 $Y_2O_3$: 0.2 | 0.5 | — | 150 | D |

TABLE 2

| Specimen No. | Cs (nF/cm²) | tan δ (%) | IR (MΩ) | ΔTc (%) | DCB (%) | Distortion factor (dB) | E.S.R. (mΩ) |
|---|---|---|---|---|---|---|---|
| 1* | 270 | 2.2 | 100 | +15 / −30 | −20 | −77 | 33 |
| 2* | 220 | 1.2 | 400 | +12 / −20 | −19 | −81 | 34 |
| 3 | 460 | 1.2 | 300 | +6 / −10 | −27 | −82 | 33 |
| 4* | 480 | 1.0 | 300 | +7 / −10 | −27 | −80 | 32 |
| 5* | 260 | 1.5 | 5 | +12 / −18 | −20 | −84 | 29 |
| 6 | 520 | 1.2 | 500 | +3 / −7 | −29 | −84 | 29 |
| 7* | 480 | 1.6 | 400 | +3 / −8 | −28 | −80 | 27 |
| 8* | 250 | 1.0 | 10 | +7 / −17 | −19 | −83 | 29 |
| 9 | 560 | 0.9 | 300 | +4 / −10 | −30 | −84 | 30 |
| 10* | 550 | 1.0 | 5 | +4 / −11 | −30 | −80 | 29 |
| 11* | 300 | 0.9 | 500 | +26 / −18 | −20 | −82 | 31 |
| 12 | 450 | 1.0 | 600 | +5 / −9 | −26 | −82 | 27 |
| 13 | 460 | 1.5 | 400 | +4 / −9 | −26 | −83 | 32 |
| 14 | 520 | 1.0 | 300 | +3 / −7 | −30 | −81 | 29 |
| 15 | 490 | 1.2 | 400 | +6 / −10 | −28 | −82 | 30 |
| 16 | 490 | 1.0 | 400 | +7 / −8 | −28 | −80 | 28 |
| 17 | 480 | 1.2 | 400 | +7 / −6 | −27 | −82 | 30 |
| 18 | 450 | 1.3 | 500 | +6 / −8 | −26 | −81 | 34 |
| 19* | 240 | 1.4 | 800 | +9 / −10 | −18 | −81 | 35 |
| 20* | 260 | 2.4 | 100 | +14 / −32 | −20 | −78 | 43 |
| 21* | 200 | 1.4 | 500 | +11 / −20 | −19 | −80 | 39 |
| 22 | 490 | 1.3 | 1.50 | +5 / −9 | −27 | −80 | 40 |
| 23* | 250 | 1.6 | 400 | +6 / −10 | −20 | −83 | 38 |
| 24 | 510 | 1.1 | 250 | +4 | −29 | −80 | 44 |

TABLE 2-continued

| Specimen No. | Cs (nF/cm²) | tan δ (%) | IR (MΩ) | ΔTc (%) | DCB (%) | Distortion factor (dB) | E.S.R. (mΩ) |
|---|---|---|---|---|---|---|---|
| 25* | 240 | 1.5 | 350 | +7 / −9 / −12 | −19 | −80 | 40 |
| 26* | 480 | 1.6 | 200 | +9 / −10 | −31 | −80 | 37 |
| 27 | 530 | 1.1 | 200 | +3 / −8 | −30 | −83 | 40 |
| 28* | 500 | 1.7 | 300 | +5 / −9 | −28 | −80 | 140 |
| 29* | 460 | 1.1 | 250 | +27 / −18 | −29 | −82 | 43 |
| 30 | 510 | 1.3 | 280 | +6 / −10 | −28 | −81 | 39 |
| 31 | 490 | 1.5 | 320 | +7 / −14 | −24 | −82 | 40 |
| 32 | 540 | 1.4 | 210 | +7 / −11 | −25 | −80 | 40 |
| 33 | 520 | 1.5 | 250 | +3 / −8 | −29 | −82 | 39 |
| 34 | 500 | 1.3 | 300 | +3 / −8 | −30 | −82 | 42 |
| 35 | 500 | 1.4 | 220 | +6 / −9 | −27 | −80 | 39 |
| 36* | 270 | 1.7 | 300 | +9 / −12 | −26 | −83 | 42 |
| 37* | 380 | 4.4 | 220 | +10 / −20 | −29 | −80 | 46 |

What we claim is:

1. A boundary layer type semiconducting ceramic capacitor comprising a semiconducting ceramic body in which grain boundaries on crystal grans of the semiconducting ceramic body are insulated, characterized in that said semiconducting ceramic body has a composition consisting essentially of 98.1 to 99.9 mole % of a main component $(Sr_{1-x}Ba_x)TiO_3$ or $(Sr_{1-x}Ba_x)TiO_3$ modified with not more than 10 mole % of calcium titanate and/or barium zirconate, wherein x is a mole fraction of Ba from 0.30 to 0.50, and 0.1 to 1.0 mole % of at least one semiconductorizing agent selected from the group consisting of a rare earth element, Nb, Ta and W, and that said grain boundaries of the crystal grains are insulated by at least one insulating agent selected from the group consisting of Mn, Bi, Cu, Pb, B and Si, and that the maximum crystal grain present in the semiconducting ceramic body has a grain size ranging from $100\mu$ to $250\mu$.

2. The boundary layer type semiconducting ceramic capacitor according to claim 1 wherein said composition contains 0.02 to 0.2 mole % of Mn.

3. The boundary layer type semiconducting ceramic capacitor according to claim 2 wherein Mn is present in at least one of the grain boundaries and the crystal grains.

4. The boundary layer type semiconducting ceramic capacitor according to claim 1 wherein said composition further contains at least one of 0.05 to 0.5 mole % of $SiO_2$ and 0.02 to 0.2 mole % of $Al_2O_3$.

5. The boundary layer type semiconducting ceramic capacitor according to claim 2 wherein said composition further contains at least one of 0.05 to 0.5 mole % of $SiO_2$ and 0.02 to 0.2 mole % of $Al_2O_3$.

6. The boundary layer type semiconducting ceramic capacitor according to claim 2 wherein Mn is present in the crystal grains.

7. The boundary layer type semiconducting ceramic capacitor according to claim 2 wherein Mn is present in the grain boundaries of the crystal grains, and wherein said grain boundaries of the crystal grains are insulated by Mn and at least one other insulating agent.

8. The boundary layer type semiconducting ceramic capacitor according to claim 1 in which the amount of the main component is 98.1 to 99.88 mole %.

9. The boundary layer type semiconducting ceramic capacitor according to claim 8 wherein Mn is present at at least one of the grain boundaries and the crystal grains.

10. The boundary layer type semiconducting ceramic capacitor according to claim 9 wherein Mn is present at the crystal grains.

11. The boundary layer type semiconducting ceramic capacitor according to claim 10 wherein said composition further includes at least one of 0.05 to 0.5 mole % of $SiO_2$ and 0.02 to 0.2 mole % of $Al_2O_3$.

12. The boundary layer type semiconducting ceramic capacitor according to claim 9 wherein said composition further includes at least one of 0.05 to 0.5 mole % of $SiO_2$ and 0.02 to 0.2 mole % of $Al_2O_3$.

13. The boundary layer type semiconducting ceramic capacitor according to claim 8 wherein said main component is $(Sr_{1-x}Ba_x)TiO_3$.

14. The boundary layer type semiconducting ceramic capacitor according to claim 1 wherein said main component is $(Sr_{1-x}Ba_x)TiO_3$.

* * * * *